Dec. 9, 1952
J. W. OVERBEKE
2,620,736
FLUID HANDLING MECHANISM
Filed Dec. 28, 1945
2 SHEETS—SHEET 1
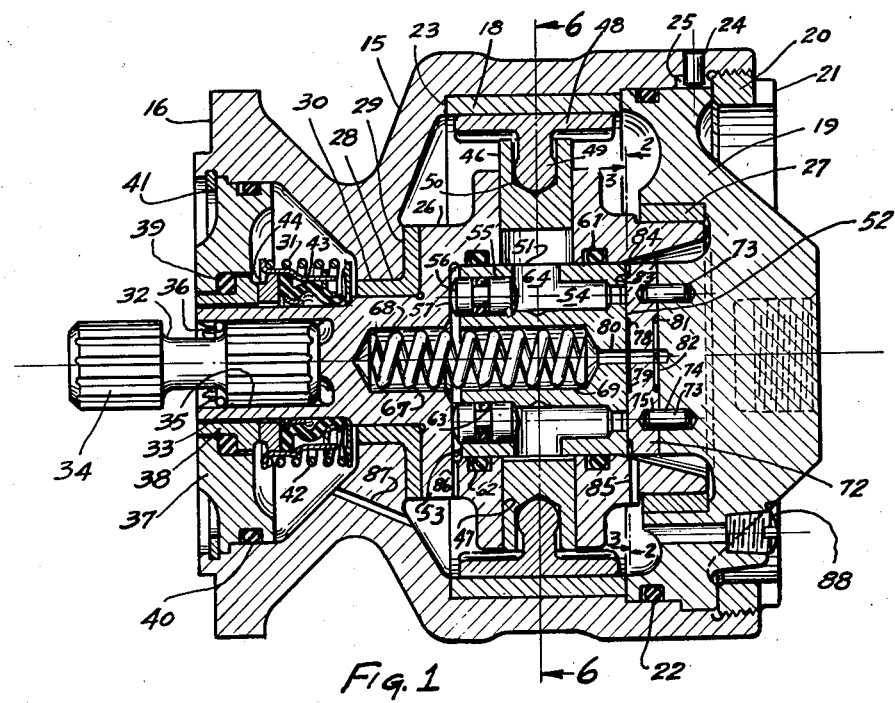
INVENTOR.
JOHN W. OVERBEKE
BY Woodling and Krost
ATTORNEYS Dec. 9, 1952   J. W. OVERBEKE   2,620,736
FLUID HANDLING MECHANISM
Filed Dec. 28, 1945   2 SHEETS—SHEET 2
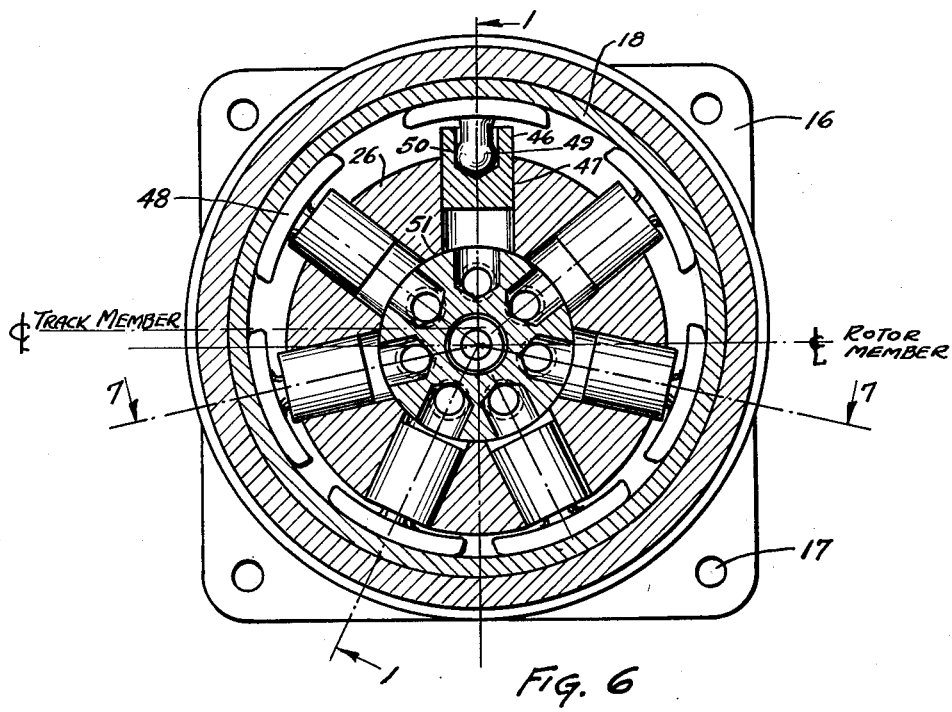
FIG. 6
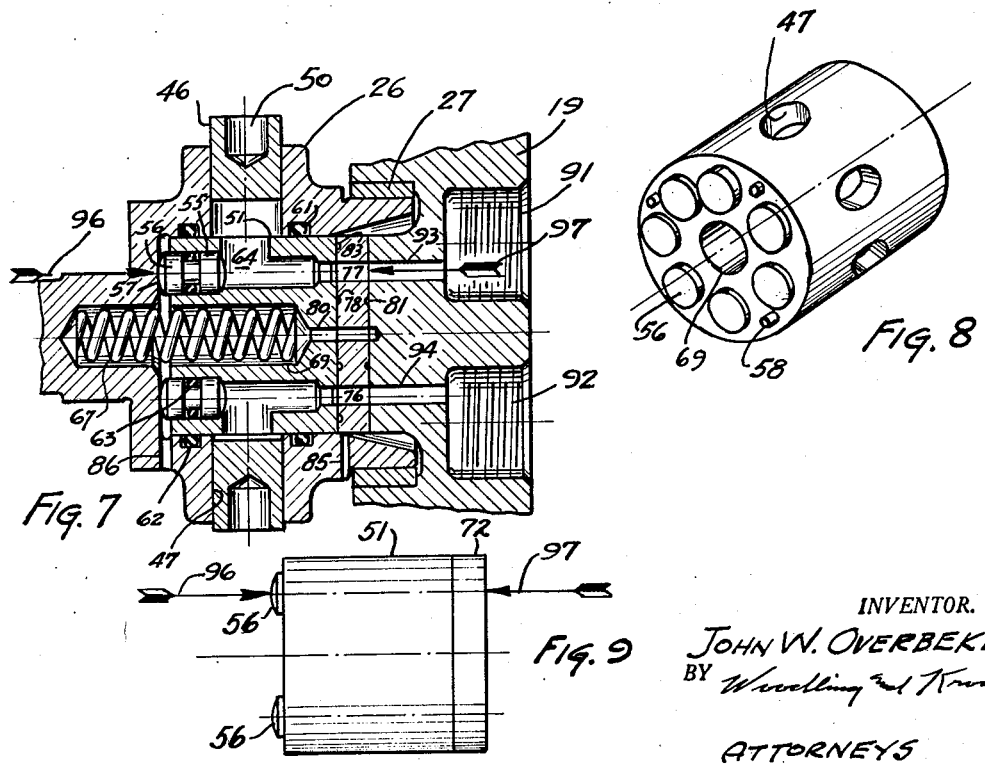
FIG. 7
FIG. 8
FIG. 9
INVENTOR.
JOHN W. OVERBEKE
BY
ATTORNEYS Patented Dec. 9, 1952

2,620,736

UNITED STATES PATENT OFFICE 2,620,736

FLUID HANDLING MECHANISM

John W. Overbeke, Cleveland Heights, Ohio

Application December 28, 1945, Serial No. 637,699

27 Claims. (Cl. 103—161)

My invention relates to fluid mechanisms and more particularly to fluid mechanisms which may be employed in fluid operated systems or circuits.

My fluid mechanism may comprise a fluid pump, a fluid motor, a fluid meter, or a fluid line valve. The use of the fluid mechanism determines whether or not it is operating as a fluid pump, a fluid motor, a fluid meter, or a fluid line valve.

An object of my invention is the provision of a fluid valve having plane mating surfaces which are adapted to operate in conjunction with a radially operated piston or pistons.

Another object of my invention is the provision of a fluid mechanism having a plurality of pistons in which each of the pistons is connected in fluid communication to an individual valve passageway.

Another object of my invention is the provision of applying a sealing force to resist fluid pressure tending to separate the mating valve parts in which the value of the sealing force is responsive to the value of the fluid pressure tending to separate the mating valve parts.

Another object of my invention is the provision of applying a sealing force to resist fluid pressure tending to separate the valve parts in the region of the area of the mating valve parts which surround the valve ports through which the fluid is being passed.

Another object of my invention is the provision of applying a sealing force to resist fluid pressure which tends to separate the mating valve parts and of applying the sealing force to the area of the mating valve parts which seal off the fluid pressure where the value of the fluid pressure is the greatest.

Another object of my invention is the provision of a valve comprising a balanced distributing plate and of applying pressure to the balanced distributing plate in the region which seals the fluid being communicated through the valve.

Another object of my invention is the provision of applying a sealing force to resist fluid pressure tending to separate the mating valve parts in the region of the valve parts which define the valve ports through which the high fluid pressure flows as distinguished from the fluid port through which the low pressure fluid flows.

Another object of my invention is the provision of applying a sealing force which is slightly greater than the value of the opposing force established by fluid pressure tending to separate the valve parts.

Another object of my invention is the provision of a valve port which delays the cut-off so that the fluid piston may be effective to move the fluid throughout the major part of the stroke.

Another object of my invention is the provision of a fluid responsive means in combination with a thrust member for urging one part of a valve against the surface of another part of the valve, and of subjecting the fluid responsive device to the pressure of the fluid flowing through the valve.

Another object of my invention is the provision of a fluid responsive device which reacts against a thrust member in which the fluid responsive device is subjected to the fluid flowing through the valve, and in which the force established by the fluid responsive device against the thrust member urges one valve part against another valve part.

Another object of my invention is the provision of a fluid responsive device which reacts against a thrust member in which the location of the fluid responsive device is substantially directly opposite the valve port and in which the fluid responsive device is responsive to the fluid flowing through the valve port for establishing a sealing force which acts substantially in a straight-line direction against the area of the mating valve parts which define the ports through which the fluid is flowing.

Other objects and a fuller understanding of my invention may be had by referring to the following description and claims, taken in conjunction with the accompanying drawing, in which:

Figure 1 shows a cross-sectional view of a fluid mechanism embodying the features of my invention and taken along the line 1—1 of Figure 6;

Figure 2 is an end view of one of the valve parts in my fluid mechanism and taken along the line 2—2 of Figure 1, the view showing only the end view of the valve parts;

Figure 3 is an end view of the other valve part taken along the line 3—3 of Figure 1 and showing only the end view of the valve parts;

Figure 4 is a fragmentary enlarged cross-sectional view taken along the line 4—4 of Figure 2;

Figure 5 is an enlarged fragmentary cross-sectional view taken along the line 5—5 of Figure 2;

Figure 6 is a vertical cross-sectional view of my fluid mechanism taken along the line 6—6 of Figure 1;

Figure 7 is a fragmentary cross-sectional view of my fluid mechanism taken along the line 7—7 of Figure 6;

Figure 8 is a perspective view of a fluid body part which comprises a part of my fluid valve and which includes fluid responsive devices for urging the fluid body against another valve part, and Figure 9 is a diagrammatic view of a fluid body part shown in relationship with the other valve parts and the application of a sealing force to oppose the force set up by the fluid pressure which tends to separate the valve parts.

With reference to the drawings, my invention comprises in general an outer casing 15 in which is mounted an annular track bearing ring 18 against which a plurality of piston shoes 48 are adapted to slide for operating a plurality of pistons 46. The pistons 46 are radially mounted within a rotor member 26 which is eccentrically mounted with respect to the annular track bearing ring 18. Mounted within the rotor member 26 is a body member 51 which has a first end 52 constituting a valve face part and which has a second end 53 which is disposed opposite a thrust surface 57 comprising a part of the rotor member 26. The first end 52 which constitutes a valve face is adapted to mate against a stationary valve plate 72. The porting of the valve comprising the stationary valve plate 72 and the first end 52 of the body member 51 is adapted to control the flow of the fluid through the fluid mechanism. The fluid valve ports are connected to the fluid openings 91 and 92 of the stationary end member 19 which is mounted in the end of the outer casing 15. The end member 19 is annularly located by a pin 24 fitting in a slot 25.

The outer casing 15 is provided upon the left-hand end thereof as shown in the drawing with a mounting flange 16 so that the fluid mechanism may be mounted in conjunction with a driven device in the event that the fluid mechanism is operated as a motor and in conjunction with a driving device in the event that the fluid mechanism is operated as a fluid pump, valve, or metering device. The mounting flange 16 may be provided with holes 17 for bolting or otherwise connecting the fluid mechanism to the device with which it is to be associated. The annular track bearing ring 18 is adapted to be mounted against the inside surface of the outer casing 15 and may be held in place between a shoulder 23 and the stationary end member 19 which abuts thereagainst. The stationary end member 19 is held in position by means of an annular retaining ring 20 which has lugs 21 thereon so that it may be threadably turned into the outer casing 15. A sealing ring 22 is provided between the stationary end member 19 and the inside surface of the outer casing 15 to make a fluid-tight seal.

The rotor member 26 is adapted to rotate upon its right-hand end within an annular internal bearing 27 which is carried by the stationary end member 19. The left-hand end of the rotor member 26 is adapted to be rotatably mounted within a flange bearing 28 having a thrust bearing portion 29 and a radial bearing portion 30. In order to make the inside portions of the fluid mechanism sealed against fluid pressure, I provide a rotary shaft seal 31 around the left-hand extension end of the rotary member 26. The rotary shaft seal 31 may be of any suitable construction so long as it seals against fluid pressure from passing between the rotor member 26 and the bearing 28 in which it rotates. As illustrated, the rotary shaft seal 31 comprises an elastic rubber-like material 43 and a rotating sealing ring 44 which is adapted to rotate relative to a stationary seal member 38. The right-hand end of the elastic rubber-like material 43 is clamped about the outside surface of the rotor extension shaft and the left-hand end is sealingly anchored to the rotating sealing ring 44. A spring 42 is employed for urging the rotating sealing ring 44 against the stationary seal member 38 whereby a good sealing engagement is always provided for blocking the passage of fluid pressure between the extension of the rotor member 26 and the bearing 28 in which it rotates. The stationary seal member 38 is held in position by a stationary seal support 37 which fits inside of the mounting flange 16. A sealing ring 39 is positioned between the stationary seal member 38 and the stationary seal support 37 in order to seal fluid pressure from passing between the left-hand shaft extension of the rotor member 26 and the bearing 28 in which it rotates. The stationary seal support member 37 may be held in position within the mounting flange 16 by means of a retaining ring 41. A sealing ring 40 is positioned between the stationary seal support 37 and the inner surface of the mounting flange 16 to seal fluid pressure from passing through the left-hand shaft extension of the rotary member 26 and the bearing 28 in which it is mounted.

The inside of the left-hand shaft extension of the rotary member 26 is provided with a female splined receptacle 35 to receive a male splined end 33 of an adapter shaft 32. The outer end of the adapter shaft 32 is provided with a male splined end 34 which is adapted to be connected with the unit with which the fluid mechanism is adapted to be associated. The adapter shaft 32 is adapted to be held within the female splined receptacle 35 by means of a retaining snap ring 36 which engages an annular shoulder within the female splined receptacle 35.

The rotor member 26 is provided with a plurality of cylinder openings 47 for reciprocally receiving the pistons 46. As illustrated, the pistons are radially reciprocated by means of piston shoes 48 which ride against the inside surface of the annular track bearing ring 18. Any suitable means may be employed to connect the pistons to the piston shoes and as illustrated I employ a socket 50 in the piston for receiving a ball end 49. When the pistons are subject to fluid pressure the sockets 50 are pressed against the ball ends 49 so that upon rotation of the rotor member 26 the pistons are caused to be reciprocally operated within the cylinder openings 47.

The body member 51 is mounted within a large recess within the rotor member 26 and is adapted to be non-rotatably connected to the rotor member 26 by means of dowel pins 58, see Figure 4. The right-hand end of the dowel pin 58 fits within a dowel opening 59 in the body member 51 and the left-hand end of the dowel pin 58 fits within an opening 60 in the rotor member 26. The dowel pins provide for driving the body member 51 along with the rotor member 26. The dowel pins 58 have a free movement within the dowel openings so that the body member 51 may have relative longitudinal movement with reference to the inside of the rotor member 26. A sealing ring 61 makes sealing engagement between the right-hand end of the body member 51 and the inside surface of the rotor member 26 and a sealing ring 62 makes sealing engagement between the left-hand end of the body member 51 and the inside surface of the rotor member 26. A plurality of openings extend from the first end 52 of the body member to the second end 53 of the body member, there being one opening for each of the pistons. The openings are connected respectively to each of the piston chambers by means of a radial fluid passage 64. The right-hand end of the longitudinal opening is indicated by the reference character 54 and comprises a fluid passage or opening extending over to the first end 52 of the body member 51. The left-hand end of the longitudinal opening comprises a bore 55 into which is mounted a plunger 56 which is responsive to the fluid pressure which is passing through the valve port between the first end 52 of the body member 51 and the stationary valve plate 72 which is also the fluid pressure within the piston chamber. The left-hand ends of the plungers are adapted to bear against the thrust surface 57 of the rotor member 26. A sealing ring 63 surrounds each of the plungers for blocking fluid pressure from passing between the plungers and the bore in which they operate. A spring 67 is adapted to urge the body member 51 against the stationary valve plate 72. The right-hand end of the spring is adapted to fit within a spring recess 69 and the left-hand end of the spring is adapted to fit within a spring recess 68.

The first end 52 of the body member constitutes a rotary valve face and is adapted to make valve sealing engagement with the stationary valve plate 72 which is stationarily mounted with respect to the stationary end member 19 of the casing. The stationary valve plate 72 is provided with two elongated arcuate valve ports 76 and 77, see Figure 3. The stationary valve plate 72 is non-rotatively connected to the stationary end member 19 by means of dowel pins 73 which fit within dowel openings 74 and 75, the dowel opening 74 being in the stationary end member 19 and the dowel opening 75 being in the stationary valve plate 72. The first end or valve face end 52 of the body member is provided with arcuate shaped elongated recesses 71 which communicate with the fluid passage openings 54. The object of making the recesses 71 somewhat elongated is that valve porting is effective throughout substantially the entire stroke of the pistons. In other words, by making the end of the fluid passages 54 somewhat elongated by the recesses 71, then I am able to delay the cut-off of the fluid flow until the pistons have completed the full length of their stroke. The arcuate shaped recesses 71 may be milled into the first end 52 of the body member 51 by means of an end mill which has a diameter substantially the same width as the valve ports 76 and 77. The fluid passage 54 may be provided by means of a drill and the drill operation is stopped short before the passage 54 reaches the first end or valve face 52. The connection portion 70 between the fluid passage 54 and the arcuate shaped recesses 71 is removed by means of an end mill which has a diameter substantially the same as the diameter of the end mill which cuts the arcuate shaped recesses 71. The valve of the invention functions in such a manner that the pressure of the fluid flowing into and out of the device tends to maintain the valve body member 51 in engagement with the fixed valve member. To this end, the opening 72 is constricted with respect to the opening 54, that is, the cross-sectional area of opening 72 is less than that of the opening 54. By this arrangement, the pressure of the fluid within the opening 54 and in cooperation with the plunger 56 develops an axial component of force directed toward the fixed valve member 72. If the cross-sectional area of the plunger 56 is the same as that of the opening 54, the pressure will be developed by the effective axially directed area adjacent the opening 72 as indicated at 100. If the cross-sectional area of the plunger 56 differs from that of the opening 54, the effective area will be the difference between the areas of the opening 70 and the plunger 56 taken in a plane normal to the axis of rotation.

It is, of course, desirable that the total force due to the fluid urging the body member 51 toward the fixed member 72 be greater than the force due to the fluid tending to separate them, although the spring member 67 provides a fixed bias. In this respect, there is associated with each passage an effective bearing area which is exposed to fluids in the fixed valve ports 76 and 77. As indicated in Fig. 2, each passage has an associated effective bearing area lying within the arc indicated at 101 and having a radial extent equal to the radial extent 102 of the fixed ports 76 and 77. The total area of these effective bearing areas exposed to the fluid in the fixed ports must thus be less than the oppositely directed bearing area due to the difference between the areas of the corresponding ports or constricted openings and the plungers or passages. The effect of differing pressures in the two fixed ports 76 and 77 will be obvious to those skilled in the art.

Due to the discontinuous nature of the ports, it is desirable, although not essential to the practice of the invention, to use a disposition of the ports such as is indicated. More particularly, the circumferential spacing between the ends of the fixed ports 76 and 77 is greater than the circumferential extent of the arcuate recesses 71. Further, an odd number of cylinders and ports are employed to avoid transitions through states of diametric balance and unbalance.

As illustrated in Figures 1 and 3, the stationary valve plate 72 is provided upon its left-hand surface with an annular groove 78 which is connected by means of a plurality of radial relief grooves 79 to a central relief opening 80 which communicates with the recess in which the spring 67 is mounted. Any fluids which escape through the relief grooves into the central opening 80 are allowed to drain radially outwardly through a drain opening 86 in the rotor member 26 and down into the inside of the outer casing 15 for lubricating the piston shoes 48 which slide relative to the annular track bearing ring 18. The left-hand surface of the stationary valve plate 72 is also provided with an outside annular relief groove 83 which is connected in communication to the inside of the outer casing 15 by means of radial slots 84 and a drain opening 85 so that fluid which escapes into the outside relief groove 83 may flow into the inside of the outer casing 15 and lubricate the piston shoes 48 which slide within the annular track bearing ring 18. The right-hand surface of the stationary valve plate 72 is provided with an annular relief groove 81 which is connected in communication with the central relief opening 80 by means of radial relief grooves 82, see Figure 1. The lower part of the stationary end member 19 is provided with a drain plug 88 so that the fluid within the outer casing may be drained when the fluid level rises beyond the drain plug 88. As shown in Figure 7, the arcuate valve ports 76 and 77 are connected to the fluid connection ports 92 and 91, respectively, by means of arcuate slots 94 and 93 which are milled into the stationary end member 19 and conform substantially to the arcuate outline of the ports 76 and 77.

When my fluid mechanism is operated as a motor, high pressure from the fluid system is connected to the fluid connection port 91 and low pressure of the system is connected to the fluid connection port 92. The high pressure fluid upon leaving the fluid connection port 91 flows through the arcuate slot 93 and then through the arcuate valve port 77 of the stationary valve plate 72, after which the fluid flows into the piston chambers below the pistons which are connected in fluid communication with the fluid passages 54 which are in communication with the arcuate valve port 77. The high pressure acting against the pistons causes the rotor member 26 to rotate for delivering power to the adapter shaft 32. After the fluid pressure has forced the pistons outwardly for causing rotation of the rotor member 26, the fluid chambers below the pistons then revolve or come into communication with the arcuate port 76 of the stationary valve plate 72 for discharging the fluid to the low pressure side of the piston. As high pressure fluid passes through the arcuate valve port 77, there is a tendency for the fluid pressure to move the body member 51 to the left as shown in Figures 1 and 7, with the result that the first end or valve face 52 of the body member tends to separate from the stationary valve plate 72. However as previously explained, in my invention I employ the plungers 56 which permit the setting up of an opposing force which is greater than the force of the fluid tending to separate the two valve parts from each other. As shown in Fig. 9, the arrow 96 shows the reaction of the rotor member 26 to the force exerted by plunger 56 while the arrow 97 shows the reaction of the fixed portion 19 of the valve member. It will be seen that since the plungers are free to move with respect to the member 51, that member may move freely against the valve plate 72 under the action of the internal pressures. Accordingly, in my invention I provide for applying a sealing force to resist fluid pressure tending to separate the valve parts in the region of the area of the mating valve parts which surround the valve port to which the fluid is being passed under high pressure. Furthermore, the sealing force made possible by the presence of the fluid plungers in the passages is slightly greater than the value of the opposing force established by the fluid pressure tending to separate the valve parts. It is to be noted that the fluid plungers which react with the thrust members are substantially directly opposite the valve port through which the high pressure fluid is passing. In other words, the sealing force made possible by the presence of the plungers acts substantially in a straight-line direction against the area of the mating valve parts which define the ports through which the fluid is flowing under high pressure.

It is to be observed that when my fluid mechanism employs a fluid valve having plane mating surfaces which are adapted to operate in conjunction with a radially operated piston or pistons, this combination enables me to provide a separate chamber or passageway 54 for each of the pistons with the result that the passageway 54 may be made relatively large as well as the valve porting so that the velocity of the fluid is kept to a relatively low value which prevents or minimizes cavitation.

When my fluid mechanism is operated as a pump the rotor member 26 is driven through means of the adapter shaft 32 and high pressure is pumped out of the fluid connection port 91 and the suction line is connected to the fluid connection port 92. The sealing forces which are made possible by the presence of the plungers to prevent the separation of the valve parts operates the same for a fluid pump as it does when the fluid mechanism is operating as a fluid motor. My fluid mechanism comprises a positive displacement fluid device and therefore it may be employed as a fluid meter because upon each reciprocation of the piston a definite amount of fluid is measured. Also, my fluid mechanism may operate as a fluid line valve by allowing the mechanism to float in the fluid system and rotating the rotor member 26 at a predetermined speed, the valve action being effected by the relative speed of the rotor member. In other words, when the rotor is driven relatively slow the effective porting of the valve action is relatively small and opposes the passage of fluid through the system and when the rotor member is driven at a higher rate of speed the effective porting of the valve action is made larger with the result that a larger amount of fluid may flow to my fluid mechanism.

It is to be understood that rotation of rotor member 26 in either direction can be accomplished by properly connecting high and low pressures from the fluid system to the appropriate fluid connection ports 91 and 92.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. A fluid mechanism comprising a rotary body having first and second oppositely disposed ends, said body having an opening extending through the body and between said ends and constituting a fluid chamber, said first end of said body constituting a rotary valve face, the opening forming a port at the face, a stationary valve member having a ported valve surface against which said valve face engages, said stationary valve member having port openings therein disposed adjacent the openings in the rotary body to determine the flow of fluid between the ports of the stationary member and the ports of the rotary body upon rotation of that body, and a thrust member disposed opposite the second end of said body and plunger means in the opening engaging the thrust member and responsive to the fluid pressure in the fluid chamber, and means for urging the valve face on the body against the valve surface of the valve member comprising a portion of the body within the chamber exposed to fluid, the pressure of the fluid in the opening in the rotary body acting to urge the plunger against the thrust member and the rotary body against the stationary valve member.

2. A fluid mechanism comprising a rotary body having first and second oppositely disposed ends, said body having an opening extending through the body and between said ends and constituting a fluid chamber, said first end of said body constituting a ported rotary valve face, a stationary valve member having a ported valve surface against which said valve face engages, said stationary valve member having port openings therein disposed adjacent the openings in the rotary body to control the flow of fluid between the ports of the stationary member and the ports of the rotary body upon rotation of that body, and a thrust member disposed opposite the second end of said body and plunger means in the opening engaging the thrust member and responsive to the fluid pressure in the fluid chamber, and means for urging the valve face on the body against the valve surface of the valve member, comprising a portion of the fluid chamber having a lesser cross-sectional area than the remainder of the chamber.

3. A fluid mechanism comprising a body rotatable about an axis and formed with one end constituting a generally radial valve face, a fixed valve member engaging the valve face, the fixed valve member having port openings therein, longitudinal passages in the body extending from the valve face end of the body through the body, the passages forming ports at the valve face end of the body disposed to cooperate with the port openings in the fixed valve member to control the flow of fluids therebetween upon rotation of the body, a plunger in each passage urged by fluid pressure therein in the longitudinal direction away from the valve face, a reaction member fixed against displacement in the axial direction with respect to the fixed valve member and engaged by the said plunger means, and a passageway intersecting each passage for flow of fluid radially therefrom and thereto, the area of each plunger exposed to fluid pressure in the passage exceeding the area of the corresponding port in the body.

4. A fluid mechanism comprising a member rotatable about an axis, a valve block rotatable with the member and formed with one end constituting a generally radial valve face, a fixed valve member engaging the valve face, cooperating ports in the valve face and the valve member, the ports in the valve face and the ports in the valve member being generally equidistant from the axis of rotation of the rotatable member, longitudinal passages in the valve block extending through the block from each port to the other end of the member, plunger means in each passage exposed to fluid in the passage, and a reaction member fixed against displacement in the axial direction with respect to the valve member and engaged by the said means, at least some of the passages in the block being constricted at some point between the exposed means and the valve face of the block whereby pressure of fluid in the passage urges the means against the reaction member and the block against the fixed valve member.

5. A radial-piston rotary fluid device comprising a casing, a rotor in the casing formed with generally radial cylinders, pistons in the cylinders, means for reciprocating the pistons synchronously with rotation of the rotor, a valve member fixed in the casing and formed with a generally radial valve surface, openings in the members forming ports at the valve surface, a valve block rotatable with the rotor defining a valve face engaging the valve surface, a plurality of ports in the valve face, a passage interconnecting each port with a cylinder and extending axially through the block, the ports in the valve surface being disposed adjacent the ports in the valve face and cooperating therewith to determine flow of fluid between the fixed valve member and the cylinders upon rotation of the rotor, and means in each passage urged by fluid pressure therein in a direction away from the valve face and engaging the rotor, the area of the passage being reduced in cross section relative to the portion of the passage containing the means engaging the rotor at a point adjacent the valve face whereby the fluid pressure in the passage develops a force tending to urge the valve block against the fixed valve member.

6. A radial-piston rotary fluid device comprising a casing, a rotor in the casing formed with generally radial cylinders, pistons in the cylinders, means for reciprocating the pistons synchronously with rotation of the rotor, a valve member fixed in the casing and formed with a generally radial valve surface, a valve block rotatable with the rotor defining a valve face engaging the valve surface, a plurality of ports in the valve face, a passage interconnecting each port with a cylinder and extending axially through the valve block, the passage being constricted at a point adjacent the valve face, the ports in the valve surface being adjacent the ports in the valve face and cooperating therewith to determine flow of fluid between the fixed valve member and the cylinders upon rotation of the rotor, a portion of the rotor forming a reaction surface adjacent the valve block, and plungers in the passages bearing upon the reaction surface whereby pressure of fluid in the passages urges the plungers toward the reaction surface and the valve block toward the fixed valve member.

7. A fluid mechanism comprising a body rotatable about an axis and including a valve face, a valve member fixed against rotation and engaging the valve face, a reaction member adjacent the body at the end opposite the valve face constrained against axial displacement relative to the fixed valve member, a plurality of circumferentially spaced and axially directed passages through the body, the passages having a constricted portion near the valve face end thereof opening into ports in the valve face, plunger means in each passage bearing against the reaction member, the constricted portion having a lesser cross-sectional area than the plunger means, and a plurality of circumferentially disposed openings in the fixed valve member forming ports cooperating with the ports in the body, whereby fluid under pressure in the passages sets up forces urging the piston means against the reaction member and the body against the fixed valve member.

8. A fluid mechanism comprising a body rotatable about an axis and including a valve face at one end thereof, a fixed valve member engaging the valve face, a reaction member adjacent the body at the end opposite the valve face constrained against axial displacement relative to the fixed valve member, a plurality of circumferentially spaced and axially directed passages through the body, the passages having a constricted portion near the valve face end thereof opening into ports in the valve face, the constricted portion having a lesser cross-sectional area than the remainder of the passage, plunger means in each passage bearing against the reaction member, a plurality of circumferentially disposed openings in the fixed valve ber forming ports cooperating with the ports in the body, and a passageway intersecting each passage whereby the flow of fluid under pressure between the ports in the fixed member and the passageways urges the plunger means against the reaction member and body against the fixed valve member.

9. The invention in accordance with claim 8 including spring means disposed between the reaction member and the body normally urging the body again the fixed valve member.

10. The invention in accordance with claim 8, the difference between the areas of the passages communicating with the ports in the fixed valve member and the constricted portions of those passages being greater than the axially effective areas of the movable valve member exposed to fluid in the fixed valve ports.

11. The invention in accordance with claim 8, the ports in the movable valve member being extended in circumferential directions.

12. The invention in accordance with claim 8, the cross sectional area of the plunger means being greater than the difference between the cross sectional areas of the passage and the constricted portion thereof.

13. In a fluid mechanism, a fixed valve member, a reaction member spaced from said valve member, a movable valve member disposed between the fixed valve member and the reaction member, the end of the movable valve member adjacent the fixed valve member comprising a valve face engaging that member, passages transversely through the movable valve member, the passages being constricted adjacent the valve face and the passages, forming ports in the valve face, ports in the fixed valve member disposed to cooperate with the ports in the movable valve member and control flow of fluids between the fixed valve member and the movable valve member, and means in the passages adjacent the reaction member for bearing upon the reaction member in response to pressure of fluid in the passage, whereby the movable valve member is urged against the fixed valve member in response to pressure of fluid in the interior of the passages upon the constricted portion of the passages.

14. In a fluid mechanism, a fixed valve member, a reaction member spaced from said valve member, a movable valve member disposed between the fixed valve member and the reaction member, the end of the movable valve member adjacent the fixed valve member comprising a valve face engaging that member, passages transversely through the movable valve member, the passages being constricted adjacent the valve face and the passages forming ports in the valve face, ports in the fixed valve member disposed to cooperate with the ports in the movable valve member and control the flow of fluids between the fixed valve member and the movable valve member, plungers in the passages adjacent the reaction member for bearing upon the reaction member in response to pressure of fluid in the passage, and passageways opening from the passages whereby pressure of fluid in the passageways urges the movable valve member against the fixed valve member.

15. The invention in accordance with claim 14, including spring means disposed between the reaction member and the movable valve member normally urging the body against the fixed valve member.

16. The invention in accordance with claim 14, the difference between the areas of the passages communicating with the ports in the fixed valve member and the constricted portions of those passages being greater than the effective areas of the movable valve member exposed to fluid in the fixed valve ports.

17. The invention in accordance with claim 14, the difference between the area of a plunger and the constricted portion of the passage being greater than the effective axially directed bearing area for fluid in the ports of the fixed valve member associated with the plunger and passage.

18. A fluid mechanism comprising a casing supporting a fixed valve member at one end thereof and having a valve face, a rotor member mounted for rotation in the said casing, the rotor member having an axially directed opening from the valve end thereof, a plurality of axially movable members within the opening constrained to rotate with the rotor, at least one of the members bearing upon the fixed valve member and the remaining members bearing upon the rotor, the members having areas subject to fluid pressure to generate forces in opposite axial directions, passages for conducting fluid between the fixed valve member and the axially movable members, the passages including cooperating ports adapted to alter the flow of fluid in accordance with the position of the rotor, radially directed cylinder openings in the rotor member, and passageways for conducting fluid between the cylinder openings and the axially movable members, whereby the flow of fluid from the fixed valve members to the cylinder openings urges the member bearing upon the fixed valve member against that member.

19. The invention in accordance with claim 18 including means normally urging the member bearing upon the fixed valve member against that member in the absence of fluid pressure.

20. In combination, a casing supporting a fixed valve member at one end thereof, a rotor member mounted for rotation in the casing, the fixed valve member having a valve face symmetric about the axis of rotation of the rotor member and having an inlet port and an outlet port extending along the circumference of a circle having a center on that axis, means constraining the rotor member against axial motion away from the fixed valve member, an axially directed opening extending into the rotor member from the fixed valve end thereof and the rotor at the inner end of the opening forming a reaction surface, a movable valve member positioned in the opening and constrained to rotate with the rotor member, the movable valve member having an axially symmetric valve face cooperating with the valve face of the fixed valve member, a plurality of radially directed cylinder openings in the rotor member, a passage transversely through the movable valve block associated with each cylinder opening and communicating therewith, and plunger means in each passage at the inner end thereof and adapted to bear upon the reaction surface in response to pressure of fluid in the passage, each passage terminating in a port at the valve face end of the body, the passages being so disposed that the ports cooperate with the fixed valve ports and being constricted adjacent the port, each passage thereby having an outwardly directed and an inwardly directed axially normal area associated therewith, the outwardly directed area being subject to pressure of fluid in the fixed valve ports and the inwardly directed area being subject to pressure of fluid in the passage, and the force exerted by the fluid upon the inwardly directed area opposing the force tending to separate the movable valve member from the fixed valve member induced by the pressure of fluid upon the outwardly directed area.

21. The invention in accordance with claim 20, the inwardly directed area being greater than the outwardly directed area.

22. The invention in accordance with claim 20, there being an odd number of passages and ports in the movable valve member spaced at equal intervals about the axis of revolution.

23. The invention in accordance with claim 20, including means normally urging the movable valve member against the fixed valve member in the absence of fluid pressure.

24. The invention in accordance with claim 20, including spring means disposed between the rotor member and the valve body normally urging the movable valve member against the fixed valve member.

25. The invention in accordance with claim 20, the movable valve ports being elongated in circumferential directions.

26. The invention in accordance with claim 20, the cross sectional area of the plunger means being greater than the difference between the cross sectional areas of the passage and the constricted portion thereof.

27. The invention in accordance with claim 20, the fixed valve ports being symmetric about the axis of revolution, and the circumferential spacing between the ends of the fixed valve ports being small relative to the length of the ports.

JOHN W. OVERBEKE.

REFERENCES CITED

The following references are of record in the file of this patent:

UNITED STATES PATENTS

| Number | Name | Date |
|---|---|---|
| 978,463 | Loedige | Dec. 13, 1910 |
| 1,822,064 | Sorensen | Sept. 8, 1931 |
| 2,161,143 | Doe, et al. | June 6, 1939 |
| 2,168,658 | Thomas | Aug. 8, 1939 |
| 2,241,701 | Doe | May 13, 1941 |
| 2,273,468 | Ferris | Feb. 17, 1942 |
| 2,284,169 | Robinson | May 26, 1942 |
| 2,299,233 | Hoffer | Oct. 20, 1942 |
| 2,364,301 | MacNeil | Dec. 5, 1944 |
| 2,391,196 | Sanderson | Dec. 18, 1945 |